United States Patent [19]
Umemura et al.

[11] Patent Number: 5,936,820
[45] Date of Patent: Aug. 10, 1999

[54] OVERHEATING PROTECTION SYSTEM OF SWITCHING MODULE

[75] Inventors: Chiaki Umemura, Georgetown Novi, Mich.; Masanori Sugiyama, Aichi Pref., Japan

[73] Assignee: Aisin Seiki Co., Ltd., Aichi, Japan

[21] Appl. No.: 09/088,063

[22] Filed: Jun. 1, 1998

[51] Int. Cl.$^6$ .................................................. H02H 5/04
[52] U.S. Cl. ................................ 361/103; 361/24; 361/25
[58] Field of Search ................................ 361/23, 24, 25, 361/26, 27, 31, 103

[56] References Cited

U.S. PATENT DOCUMENTS

| | | | |
|---|---|---|---|
| 4,924,112 | 5/1990 | Anderson et al. | 361/103 |
| 5,268,601 | 12/1993 | Cossins | 307/491 |
| 5,838,578 | 11/1998 | Pippin | 364/488 |

FOREIGN PATENT DOCUMENTS

| | | |
|---|---|---|
| 1298940 | 12/1989 | Japan . |
| 7274569 | 10/1995 | Japan . |
| 7298669 | 11/1995 | Japan . |
| 8172793 | 7/1996 | Japan . |

*Primary Examiner*—Sally C. Medley
*Attorney, Agent, or Firm*—Sughrue, Mion, Zinn, Macpeak & Seas, PLLC

[57] ABSTRACT

An overheating protection system for a switching module prevents thermal breakdown of switching devices for passing currents through a load, for example an electric motor, while making it possible for the switching module to provide as much required current to the load as possible. The system comprises a temperature detector for detecting the temperature of a switching module, a temperature estimator for calculating a temperature change rate of a switching device inside the switching module corresponding to a current passed through the load and calculating an estimated value of the internal temperature of the switching module on the basis of the calculated temperature change rate and the detected temperature and a current limiter for on the basis of the estimated value correcting a target current value of a current controller controlling a current passed by the switching device.

5 Claims, 6 Drawing Sheets

OVERHEATING PROTECTION SYSTEM OF SWITCHING MODULE

BACKGROUND OF THE INVENTION

This invention relates to an overheating protection system for a switching module for driving a load, and particularly, although the invention is not limited to this, to a system for protecting switching devices inside a switching device module for chopping current through phase coils of an electric motor.

For example, a switching circuit for driving a switched reluctance motor (hereinafter abbreviated to SR motor) will be described. A switched reluctance motor generally has a rotor which is constructed with poles projecting outward and a stator constructed with poles projecting inward, and the rotor is simply an iron core while the stator has coils wound in concentration around each pole. In this kind of SR motor, the poles of the stator act as electromagnets and the rotor is rotated by its poles being attracted by magnetic forces of the stator. Accordingly, by the state of excitement of the coils wound on the poles of the stator being successively switched according to the rotational positions of the poles of the rotor, the rotor can be rotated in a desired direction. This type of SR motor is disclosed for example in Japanese Unexamined Patent Publication No. H.1-298940.

In an SR motor, when the poles of the rotor are in a certain rotational positions, the currents being passed through the stator coils are switched. In technology disclosed in Japanese Unexamined Patent Publication No. H.1-298940, a rotational position signal having gentle rises and falls is generated and using this rotational position signal the rises and falls in current of when the currents to the coils are switched on and off are made gentle. Also, in Japanese Unexamined Patent Publication Nos. H.7-274569, H.298669 and H.8-172793, to make the rises and falls in current smooth, the currents passed through a motor are controlled by means of a PWM using an H-type switching circuit, and to lessen shortages of torque the switching mode is controlled.

For example, an SR motor driving system of an electric vehicle in which this kind of SR motor is used has phase drivers (in the case of a three-phase motor, three) including switching devices and gate drivers for passing currents through phase coils, phase current controllers for generating current patterns for the phases (time series current distributions) having phase differences between the phases and passing phase currents according to these patterns through the phase coils, and a system controller for generating target phase currents corresponding with torque motor driving commands and torque commands and supplying these to the phase controllers. The switching devices for passing currents through the phases are provided in a module, and to prevent thermal breakdown of the switching devices a temperature sensor is mounted on the switching device module and each phase driver is provided with a gate signal cutoff circuit for cutting of an on-command signal to the respective gate driver when the temperature detected by this sensor rises above a set value. Current sensors for detecting the currents in the phase coils and an over-current detecting circuit are also provided, and when a coil current becomes excessive a cutoff command signal is fed to the gate signal cutoff circuit and the currents of all the coils are cut off.

However, the temperature sensor is in a position away from the switching devices inside the module, and it takes time for heat produced by the switching devices to reach the temperature sensor, and at times when the amount of heat produced by the devices is large, such as during high-current excitation and at low motor speeds (when the excitation time of each phase is long), there is a risk of the temperature of a device reaching a limit temperature exceeding a threshold value at which the gate signal cutoff circuit operates even though the detected temperature of the temperature sensor has not reached the threshold value, and the switching device consequently breaking before the gate signal cutoff circuit turns the gate off in response to the detected temperature. To avoid this the temperature threshold value at which the gate signal cutoff circuit operates is set low and the motor drive is inhibited.

SUMMARY OF THE INVENTION

It is therefore a first object of the present invention to prevent thermal breakdown of a switching device module for passing a current through a load and a second object of the invention to provide as much required current to the load as possible.

To achieve these and other objects, the invention provides:

(1) an overheating protection system comprising temperature detecting means (TS, TDC) for detecting the temperature (INVT) of a switching module (1PM) for passing a current through a load (1), temperature estimating means (11) for calculating a temperature change rate (it1) of a switching device (18a, 18b) inside the switching module corresponding to a current passed through the load (1) and calculating an estimated value (IGBTT) of the internal temperature of the switching module on the basis of the calculated temperature change rate (it1) and the detected temperature (INVT), and current limiting means (11) for, on the basis of the value (IGBTT) estimated by the temperature estimating means (11), correcting a target current value of current controlling means (current controller 1) for controlling a current passed by the switching device (18a, 18b). To facilitate understanding, reference numerals of corresponding elements of preferred embodiments shown in the accompanying drawings and described hereinafter are included in parentheses for reference.

According to the invention, because the temperature of the switching device is estimated with a higher accuracy than that of internal temperature estimation based solely on module temperature measurement using a sensor, the reliability of the overheating protection is high. Because the current limiting means (11) corrects the target current value for load driving on the basis of the estimated value (IGEIT) of the internal temperature of the switching module, for example by means of correction wherein, as the estimated value (IGBIT) approaches a limit temperature of the switching device, the target current value is lowered progressively further, or correction wherein, when the estimated value (IGBTT) reaches a threshold value the target current value is made zero (i.e. the gate is switched off), as much required load current as possible can be provided while furthermore thermal breakdown of the switching device is avoided.

(2) An overheating protection system according to (1) above, further comprising current detecting means (2, 5) for detecting a load current or a command value of a current to the load, wherein the temperature estimating means (11) calculates a temperature change rate (it1) corresponding to the current value (WC1) detected by the current detecting means (2, 5), the temperature change rate having a positive high value when the current value (WC1) is high and a negative low value when the current value is low. While a switching device is heated as it passes current, heat is removed from it by heat dissipation of the module. The amount of heat produced by the switching device depends on the current passing through it, and the amount of heat removed from it is proportional to the temperature difference between the switching device and the module base. When the heat produced minus the heat removed has a positive value the temperature of the device rises, and when it has a negative value the temperature of the device falls. When the current is high, the heat produced minus the heat removed is positive (temperature increase), and when the current is low it is negative (temperature fall). According to the provision of the invention described above, because the current detecting means (2, 5) calculates the temperature change rate (it1) in accordance with this, the reliability of the estimated value (IGBTT) of the internal temperature of the switching module is high.

(3) An overheating protection system of a switching module comprising temperature detecting means (TS, TDC) for detecting the temperature (INVT) of a switching module (1PM) for passing currents through phase coils of an electric motor (1), temperature estimating means (11) for calculating temperature change rates (it1 to it3) of switching devices (18a, 18b) inside the switching module corresponding to currents (WC1 to WC3) passed through the phase coils (1a to 1c) of the electric motor and calculating an estimated value (IT1 to 1T3) of the internal temperature of switching devices of each phase inside the switching module on the basis of the calculated temperature change rates (it1 to it3) and the detected temperature (INVT) and current limiting means (11) for, on the basis of the estimated temperature values (IT1 to 1T3), correcting target current values of current controlling means (current controllers 1 to 3) for controlling currents passed through the phase coils of the electric motor (1).

According to this provision of the invention, because different estimated temperature values (IT1 to 1T3) are calculated for the different phases inside the switching module, the reliability of the estimated temperature values is high, and therefore the reliability of the overheating protection of the switching devices of the motor drivers and of the motor drive is high.

(4) An overheating protection system according to (3) above, wherein the temperature estimating means (11) sets the maximum value of estimated temperature values (IT1 to 1T3) of the switching devices of the phases as a representative temperature (IGBTT) and the current limiting means (11) corrects the target current values of the current controlling means (current controllers 1 to 3) for controlling the currents passed through the phase coils of the electric motor (1) on the basis of the representative temperature (IGBTT). According to this provision of invention, because the motor currents are controlled on the basis of the maximum value of estimated temperature values (IT1 to 1T3) of the switching devices of the phases, the reliability of the overheating protection of the motor drivers is high.

(5) An overheating protection system of a switching module according to (3) above, further comprising current detecting means (2 to 4) for detecting currents of the phase coils (1a to 1c) of the electric motor (1), wherein the temperature estimating means (11) calculates temperature change rates (it1 to it3) corresponding to the phase current values (TW1 to TW3) detected by the current detecting means (2 to 4, 5), the temperature change rates each having a positive high value when the respective current value is high and a negative low value when the respective current value is low. According to this provision of the invention, because the temperature change rates (it1 to it3) are calculated in correspondence with temperature rises and falls of the switching devices, the reliability of the estimated value (IGBTT) of the internal temperature of the switching module is high.

Other objects and features of the invention will become apparent from the following description of a presently preferred embodiment thereof and from the accompanying drawings.

DETAILED DESCRIPTION OF THE PREFERRED EMBODIMENTS

Figure 1:
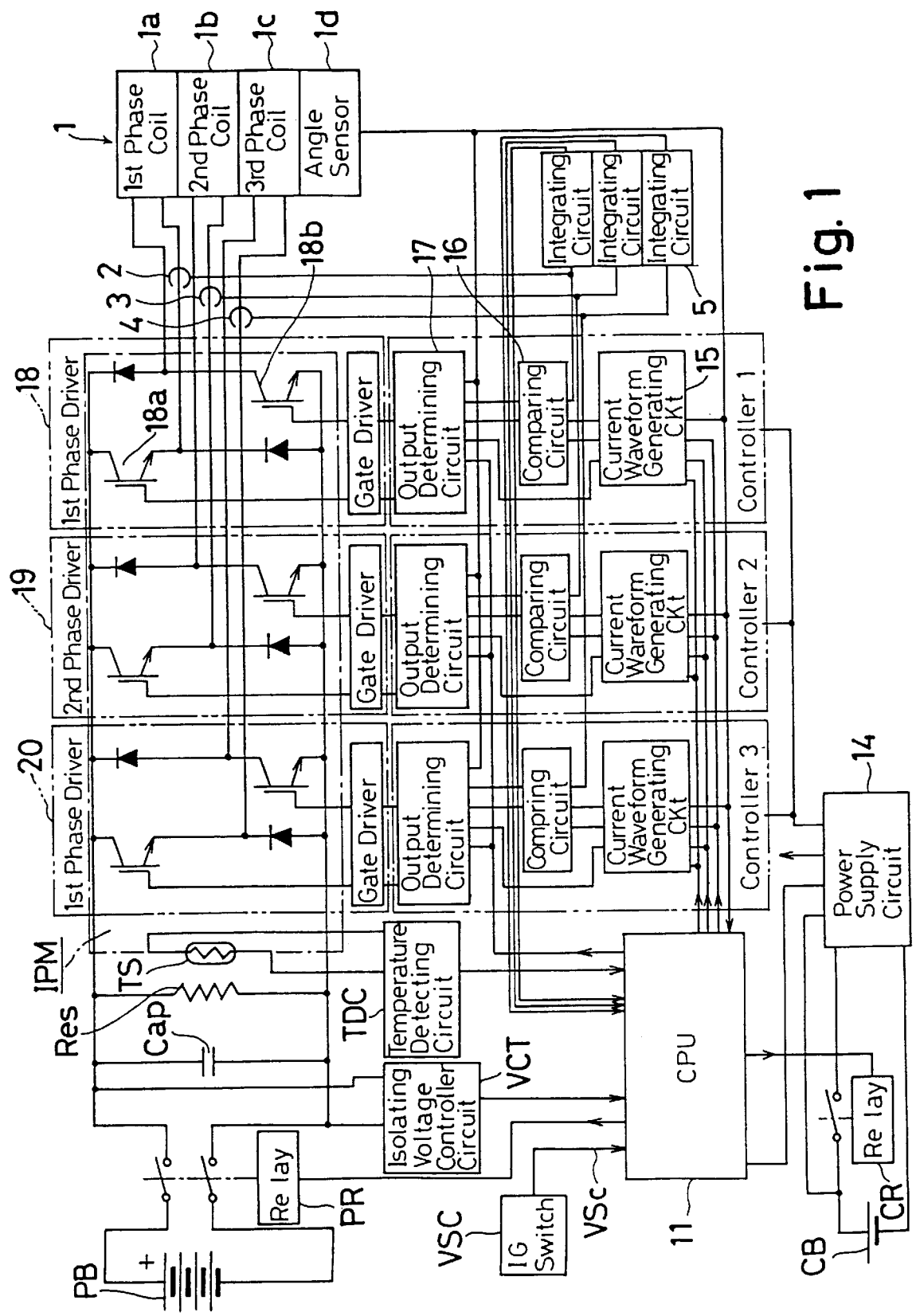
FIG. 1 is a block diagram showing the construction of a preferred embodiment of the invention.

A preferred embodiment of the invention is shown in FIG. 1. The apparatus shown in FIG. 1 constitutes a main part of an electric motor driving unit of a hybrid electric car in which are mounted an internal combustion engine and a switched reluctance motor (hereinafter abbreviated to SR motor) which are both for driving wheels of the car. In this example, one SR motor 1 is provided as an electric driving source, and this SR motor 1 is controlled by a CPU 11 of an electric system controller. State signals and a demand signal from a shift lever switch, a brake switch, an accelerator switch and an accelerator demand sensor are inputted into the CPU 11 through an input-output interface (not shown) of the system controller, and the CPU 11 controls the SR motor 1 on the basis of this information. The SR motor 1 has coils 1a, 1b, 1c of three phases for driving it and an angle sensor 1d for detecting the rotational position (angle) of its rotor. The three phases of coils 1a, 1b and 1c are respectively connected to motor drivers 18, 19 and 20, and current sensors 2, 3 and 4 are respectively disposed in a line connecting the coil 1a and the driver 18, a line connecting the coil 1b and the driver 19, and a line connecting the coil 1c and the driver 20. These current sensors 2, 3 and 4 output voltages proportional to the currents actually flowing through the coils 1a, 1b, 1c as current signals to comparing circuits 16 (three) and integrating circuits 5 (three). These current signals are noise-processed with short smoothing time constants and are equivalent to substantially instantaneous values. The integrating circuits 5 generate analog voltages expressing time series averages of the currents of the coils and feed these to an A/D conversion port of the CPU 11. The smoothing time constants of the integrating circuits 5 are long.

The CPU 11 feeds current commands (target currents) to current controllers 1 through 3. The current controllers 1, 2 and 3 respectively control currents passing through the first phase coil 1a, the second phase coil 1b and the third phase coil 1c of the SR motor 1 by way of the motor drivers 18, 19 and 20.

The current controller 1 has a current waveform generating circuit 15, a comparing circuit 16 and an output determining circuit 17. The construction and the function of the current controllers 2 and 3 are the same as those of the current controller 1.

A battery PB on the vehicle constituting a d.c. power source for driving the electric motor has a high-voltage output of about 288V, and when a driving power supply relay PR is switched on, the voltage of the battery PB is applied to motor drive supply lines. A capacitor Cap and a resistor Res for absorbing ripples are connected to the supply lines. Because the motor drive current is high, at several hundred A, the capacitance of the capacitor Cap is large, at about 8100 F. However, the resistance of the resistor Res is a high resistance, to reduce power consumption, and the discharge time constant of the parallel circuit of the capacitor Cap and the resistor Res is considerably large. Therefore, when the driving power supply relay PR is switched off while the motor drivers 18, 19 and 20 are all off, the voltage of the capacitor Cap (the motor driver supply line voltage) maintains a high value for a long period. To discharge this voltage in a short time, as will be further discussed later, the driving power supply relay PR is switched on and then the CPU 11 of the system controller issues a current-passing command to the current controllers 1, 2 and 3 and thereby makes the motor drivers 18, 19 and 20 current-passing and causes the charge of the capacitor Cap to discharge through the coils 1a, 1b, 1c of the SR motor 1.

Separately from the driving power supply circuit, a control power supply battery CB and a control power supply circuit 14 are also provided. The power supply circuit 14 includes a constant voltage circuit having an extremely low power consumption which is directly connected to the battery CB and normally feeds a constant voltage to the CPU 11, and a constant voltage circuit having a relatively large power consumption which when a control power supply relay CR is on is connected to the battery CB and feeds a constant control voltage to the current controllers 1 to 3, (a control voltage line of) the motor drivers 18, 19 and 20, and various detectors and detecting circuits.

An operating voltage is always fed to the CPU 11, irrespective of whether the control power supply relay CR is on or off. When a vehicle power supply throw signal VSs expressing whether an ignition switch VSC mounted on the vehicle is on or off changes from a low level L indicating that the ignition switch VSC is off to a high level H indicating that it is on, the CPU 11 switches the control power supply relay CR on and switches the driving power supply relay PR on. When the vehicle power supply throw signal VSs changes from H (VSC on) to L (VSC off), the CPU 11 switches the driving power supply relay PR off and converts to digital and reads in the output voltage of an isolating voltage convertor circuit VCT, and if this is above a set value, issues a current-passing command to the current controllers 1 through 3. When the output voltage of the isolating voltage convertor circuit VCT becomes less than the set value, the CPU 11 stops the current-passing of the current controllers 1 through 3 and switches the control power supply relay CR off.

The isolating voltage convertor circuit VCT includes a voltage-dividing resistance circuit for dividing the voltage of the capacitor Cap, a comparing circuit for comparing a divisional voltage thus obtained with a sawtooth wave and thereby converting it into a PWM pulse (duty ratio), a photo coupler for isolatingly transmitting the PWM pulse, and a pulse width-voltage converting circuit for converting into an analog voltage the isolatingly transmitted pulse, and feeds the analog voltage produced by the pulse width-voltage converting circuit to an A/D-converting input port of the CPU ii. When the driving power supply relay PR is on, when power supply voltage information is necessary or with a predetermined period, the CPU 11 A/D-converts and reads in the output analog voltage of the isolating voltage convertor circuit VCT. When it switches the driving power supply relay PR off, the CPU 11 A/D-converts and reads in this analog voltage again and instructs the current controllers 1 through 3 to pass current through the SR motor 1 until the voltage value read in drops to below a set value.

During steady-state driving of the electric motor 1 (while the driving power supply relay PR is on), the CPU 11 of the system controller successively computes a required direction, a driving speed and a driving torque of the SR motor 1 on the basis of information inputted from the shift lever, the brake switch, the accelerator switch and the accelerator demand sensor, and on the basis of the results of this computation controls the currents passed through the coils 1a, 1b and 1c of the SR motor 1.

The angle sensor Id outputs an eleven bit binary signal showing an absolute angle value of 0° to 360°. The minimum resolution of the detected angle is 0.5°. On the basis of the least significant two bits of the signal outputted by the angle sensor 1d, the CPU 11 detects the direction of rotation of the rotor of the SR motor 1 (clockwise CW or counter-clockwise CCW), and generates a direction detection signal S11 having a value H (1) when the direction of rotation of the rotor is CW and a value L (0) when it is CCW, and holds this in a register as well as feeding it to the output determining circuits 17.

One end of the first phase coil 1a of the SR motor 1 is connected to the high potential line of the power supply through a switching transistor (IGBT) 18a, and the other end of the coil 1a is connected to the low potential line of the power supply through a switching transistor (IGBT) 18b. A diode is connected between the emitter of the transistor 18a and the low potential line, and a diode is connected between the emitter of the transistor 18b and the high potential line. Thus, if the transistors, 18a and 18b are both switched on (made current-passing) a driving current is passed through the coil 1a, and if either or both of the transistors 18a and 18b are switched off (made non-current-passing) the supply of electricity to the coil 1a is stopped.

The CPU 11 feeds to the output determining circuits 17 a mode specifying signal S5 which when the required direction of rotation of the SR motor 1 determined by the CPU 11 on the basis of information inputted from the shift lever, the brake switch, the accelerator switch and the accelerator demand sensor and the actual direction of rotation inferred by the CPU 11 itself are the same, i.e. when the rotor of the motor is rotating in the same direction as the specified direction, is H (meaning that soft chopping is possible) and when they are opposite directions is L (prohibiting soft chopping and specifying hard chopping).

The output determining circuit 17 of the current controller 1 outputs a result, received from the respective comparing circuit 16, of comparing a first reference voltage Vr1 outputted by the respective current waveform generating circuit 15 with the voltage of the current signal of the current sensor 2 as a binary signal S71 to a gate driver of the motor driver 18 for forwarding to the transistor 18a, and outputs a result, received from the comparing circuit 16, of comparing a second reference voltage Vr2 outputted by the current waveform generating circuit 15 with the voltage of the current signal of the current sensor 2 as a binary signal S72 to the gate driver for forwarding to the transistor 18b. In this preferred embodiment, the relationship Vr1<Vr2 always holds.

When a phase excitation command signal S5 produced by the current waveform generating circuit 15 is at a high level H (specifying first phase excitation), according to the size relationship between the voltage Vs6 of the current signal of the current sensor 2 and the reference voltages Vr1 and VR2, the states of the transistors 18a and 18b of the driver 18 are set to one of three combinations, as shown in Table 1.

TABLE 1

| Case | | Tr18a | Tr18b |
|---|---|---|---|
| 1 | Vs6 ≦ Vr1 | on | on |
| 2 | Vr1 < Vs6 ≦ Vr2 | off | on |
| 3 | Vr1 < Vs6 ≦ Vr2 | off | off |
| 4 | Vs6 > Vr2 | off | off |

The combinations [1] and [4] being repeated alternately is hard chopping, and the combinations [1] and [2] being repeated alternately is soft chopping. The case of Vr1<Vs6 Vr2 of [3] above is a case wherein ordinarily the state would be brought to 18a: off, 18b: on as in [2] but because the direction of rotation of the rotor of the SR motor 1 is opposite to the specified direction this has been changed to 18a: off, 18b: off to prevent destruction of the transistors 18a, 18b.

As mentioned above, the transistors 18a, 18b may be either both on or both off, or one may be on and the other off, and which of these states is assumed is determined by whether the level of the voltage Vs6 of the current signal of the current sensor 2 is smaller than Vr1, between Vr1 and Vr2 or larger than Vr2 and, when it is between Vr1 and Vr2, whether or note the direction of rotation of the rotor of the motor is the same as the specified direction.

When the phase excitation command signal S5 is at its low level L (commanding non-excitation of the first phase), irrespective of the states of the signals S71, S72 outputted by the comparing circuit 16, the transistors 18a, 18b are both switched off.

The rise characteristic (rate of increase) of the current flowing through the coil 1a when the transistors 18a, 18b are both switched on is determined by circuit time constants and cannot be changed by control. However, when the current is cut off, there is a difference in the fall characteristic (the rate of decrease) of the current between when the transistors 18a, 18b are both switched off and when the transistor 18a is switched off and the transitory 18b is left on and consequently, it is possible to adjust the rate of the fall in the current by switching this. That is, when the transistors 18a, 18b are both switched off, the change in the current is rapid, and when the transistor 18a is switched off but the transitory 18b is left on, the change in the current is slow.

When there is almost no change in the target current values (Vr1, Vr2), even when the current fall rate is slow, because the deviation between the reference level (vr1) and the level of the current actually flowing (Vs6) does not increase, the state Vs6<Vr2 is always maintained. Therefore, at this time, the current fluctuation amplitude is small. When, as at times of switching of the phase of the coil being excited, the target current values (Vr1, Vr2) are changed, if the current fall rate is slow, Vs6>Vr2 arises. In this case, because the two transistors 18a, 18b are both switched off, the current fall rate increases and the current follows the target values (Vr1, Vr2) and changes swiftly. If there ceases to be change of the target values, because the deviation between the reference voltage Vr1 and the current level Vs6 becomes small, again the current fall rate becomes slow. By this means, not only is follow-up lag of the current with respect to changes in the target values prevented, but also, when changes in the target values are small, because the current change rate is slow, the occurrence of vibration and noise is suppressed.

When the current fall rate is switched by the above mentioned signals S71, S72 outputted by the output determining circuit 17, in the timing of this switching there is a tendency for the actual switching to be somewhat later than the ideal time. That is, ideally the current fall is made rapid when the target values drop suddenly, but because actually the signal S72 does not become L unless the current deviation becomes large, chronologically a delay arises. Consequently, when the target values change very rapidly, with automatic change rate switching effected by the signals S71, S72 only, there is a possibility of the current not following the target values sufficiently well.

To overcome this, in this preferred embodiment, by controlling the phase excitation command signal S5, it is possible to increase the current fall rate irrespective of the size of the current (Vs6). That is, when the signal S5 is brought to its low level L, irrespective of the signals S71, S72 the transistors 181, 18b go off simultaneously and consequently, the current fall rate increases.

The current waveform generating circuit 15 outputs the two reference voltages Vr1, Vr2 and the phase excitation command signal S5. The reference voltages Vr1, Vr2 and the phase excitation command signal S5 are respectively generated on the basis of information stored in memories (RAM) 15b, 15a and 15c (not shown) inside the current waveform generating circuit 15. The memories 15b, 15a and 15c respectively hold eight bit, eight bit and one bit data in each address. Eight bit data read out from the memory 15a is converted into an analog voltage by a D/A-convertor 15e (not shown) inside the current waveform generating circuit 15, passes through an amplifier 15g (not shown) inside the current waveform generating circuit 15 and becomes the reference voltage Vr2. Similarly, eight bit data read out from the memory 15b is converted into an analog voltage by a D/A-convertor, passes through an amplifier and becomes the reference voltage Vr1. One bit data outputted by the memory 15c becomes the phase excitation command signal S5.

The above mentioned memories 15b, 15a and 15c (not shown) each have many addresses, and each address is associated with a rotational position (angle) (in 1° units) of the rotor R. An address coder of the current waveform generating circuit 15 generates address information from a signal expressing the rotational position of the rotor detected by the angle sensor 1d. This address information is simultaneously inputted into address input terminals of the three memories 15b, 15a and 15c. Consequently, when the SR motor 1 rotates, the memories 15b, 15a and 15c successively output the data held in the addresses corresponding to the rotational positions of the rotor. Thus the states of the reference voltages Vr1, Vr2 and the phase excitation command signal S5 change with the rotational position of the rotor.

Figure 6:
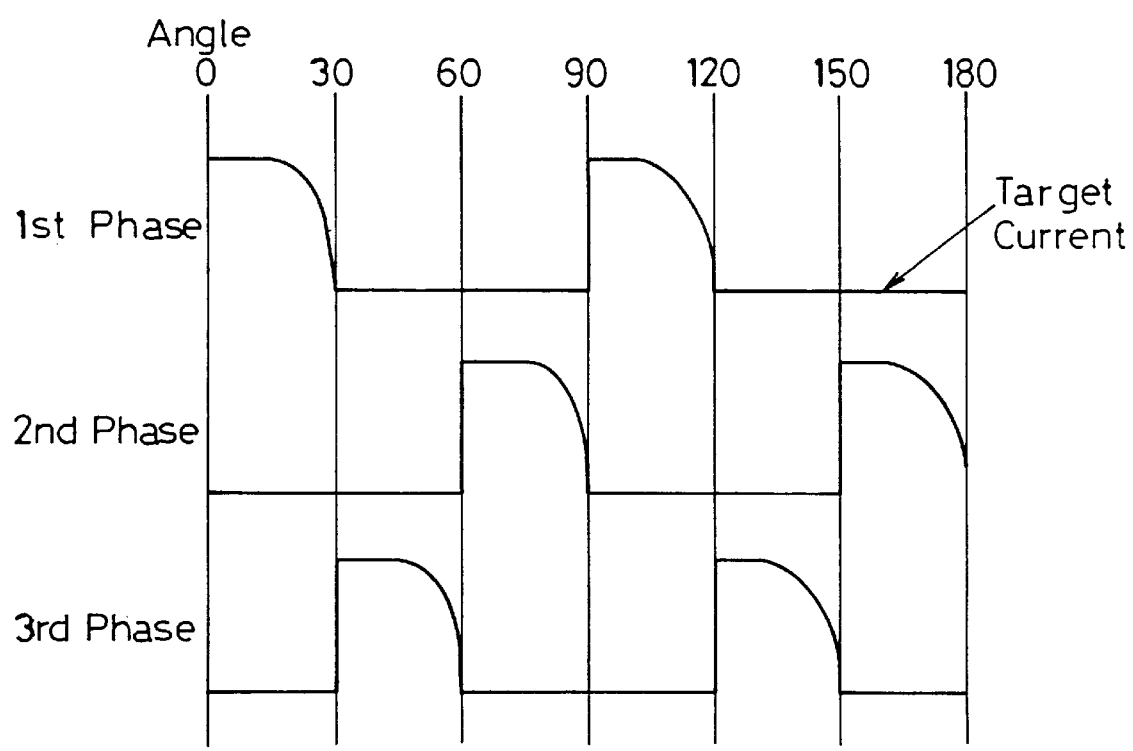
FIG. 6 is a time chart showing an example of a waveform of excitation current commands for driving an SR motor 1 shown in FIG. 1.

In practice, to pass currents having the waveforms shown in FIG. 6 through the coils of the three phases, information of an excitation map is held in the memories 15a and 15b. That is, in each of the addresses associated with each rotational position (in this example, every 0.5°), a target value of the current to be set at that position is held. Because the information in the memories 15a and 15b corresponds to the reference voltages Vr2 and Vr1 respectively, the content of the memory 15a and the content of the memory 15b differ slightly so as to satisfy the relationship Vr2>Vr1. Since as described above, the level of the current flowing through the coil 1a changes so as to follow the reference voltage Vr1, by registering the waveform of the current to be passes through the coil 1a in the memories 15b and 15a as the reference voltages Vr1, Vr2, it is possible to make a current flow as shown in FIG. 6.

In this preferred embodiment, it is necessary for excitation/non-excitation of the coils 1a, 1b, 1c of the three phases to be switched every time the rotor rotates through 30°, as shown in FIG. 6, but by the kind of waveform shown in FIG. 6 being recorded in the memories 15b and 15a, this excitation/non-excitation switching every 30° can also be automatically effected by the signals S71, S72. That is, it is not necessary for the CPU 11 to perform excitation/non-excitation switching of the coils.

In the memory 15c, the information "1" corresponding to the high level H of the phase excitation command signal S5 is held in most of the addresses, but in addresses corresponding to angles at which the target current values (Vr1, Vr2) fall suddenly, the information "0" (forced cutoff information) corresponding to the low level L of the phase excitation command signal S5 is held. That is, at rotational positions such as the point at which the target current values (Vr1, Vr2) start to fall, where the slope of decrease of the target current values is steep and it can be predicted that it would be beneficial to increase the current change rate, instead of waiting for the automatic switching effected by the signal S72, the signal S5 is switched to its low level L by information stored in the memory 15c and the current change rate is thereby forcibly increased. By this means it is possible to avoid a time delay arising in the switching of the current change rate and the current is made to follow the target values still better.

The memories 15b, 15a and 15c are writable and readable, and writing and reading thereof can be carried out simultaneously. The memories 15b, 15a and 15c are connected to the CPU 11 by a signal line, and the CPU 11 updates the contents of the memories 15b, 15a and 15c as necessary.

Figure 2:
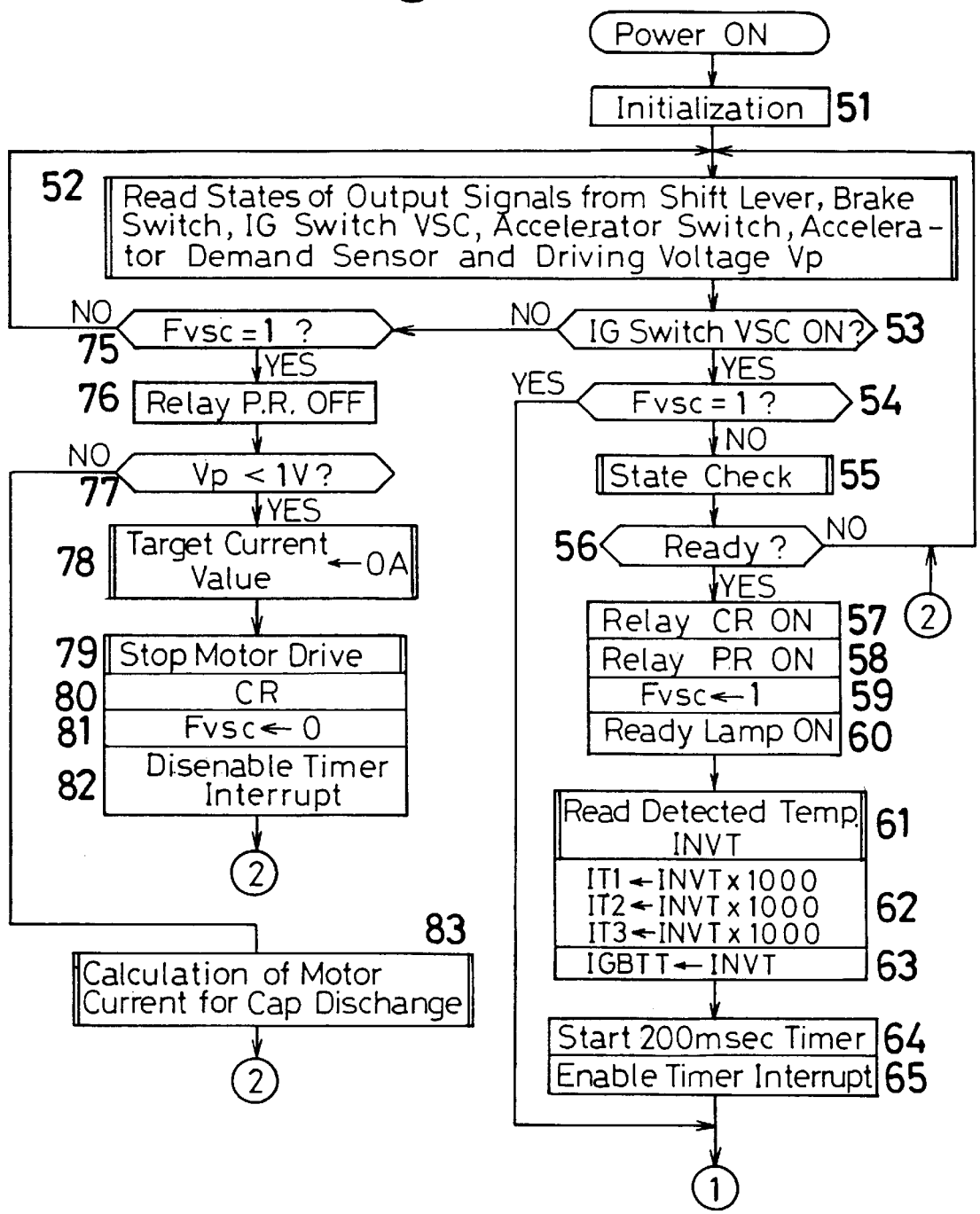
FIG. 2 is a flow chart showing a part of an operation of a CPU 11 shown in FIG. 1.
Figure 3:
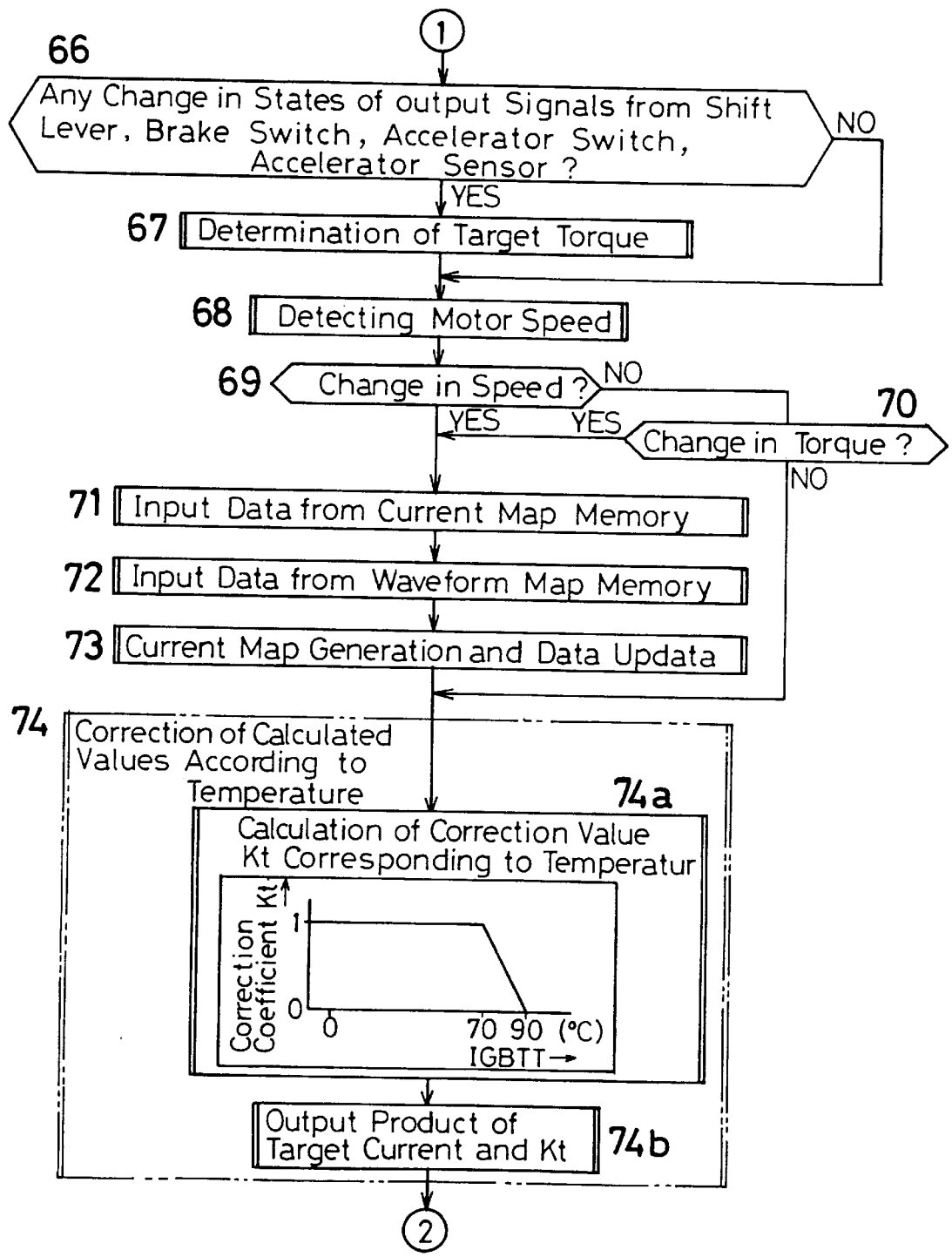
FIG. 3 is a flow chart showing the remainder of this operation of the CPU 11 shown in FIG. 1.

The operation of the CPU 11 is shown in outline in FIG. 2 and FIG. 3. Referring first to FIG. 2, when the power supply is switched on (and an operating voltage is fed to the CPU 11 rom the battery CB and the power supply circuit 14) in a step 51, initialization is carried out. That is, initialization of memories inside the CPU 11 and mode setting of internal timers, interrupts and so on is carried out and then system diagnosis is carried out and if there are no abnormalities, the CPU 11 proceeds to the next step.

In Step 53, on/off of the ignition switch VSC (H/L of the throw signal VSs) is checked and if it is on (H), in step 54, it is determined with reference to data of a register Pvac (1 if the ignition switch VSC was already on, 0 if not) whether or not this constitutes a changeover from off to on. When it is determined that this is a changeover from off to on, in steps 55 and 56, normal/abnormal is checked with reference to the state data, and if the states are normal the control power supply relay CR is switched on and the driving power supply relay PR is switched on, the value 1 is written into the register Pvac, and a ready lamp is lit (steps 57 through 60). Hereinafter in parentheses the word "step" will be omitted and the step number only will be written.

Next, a detected temperature signal (an analog voltage) of a temperature sensor TS attached to a switching device module IPM constituting the motor drivers is converted to digital and read in (61). In the following, a value expressing the digital data of the detected temperature signal will be expressed as INVT. The detected temperature INVT read in is then multiplied by 1000 (a constant for calculation) and this product is written to registers (individual temperature registers) IT1 through IT3 for the phase drivers 18, 19 and 20. However, it is 1/1000 of the value expressed by the data that is units of °C.

Next, a 200 msec timer having a time limit of 299 msec is started (64) and interrupt processing following the timer reaching its time limit is permitted (65).

Figure 4:
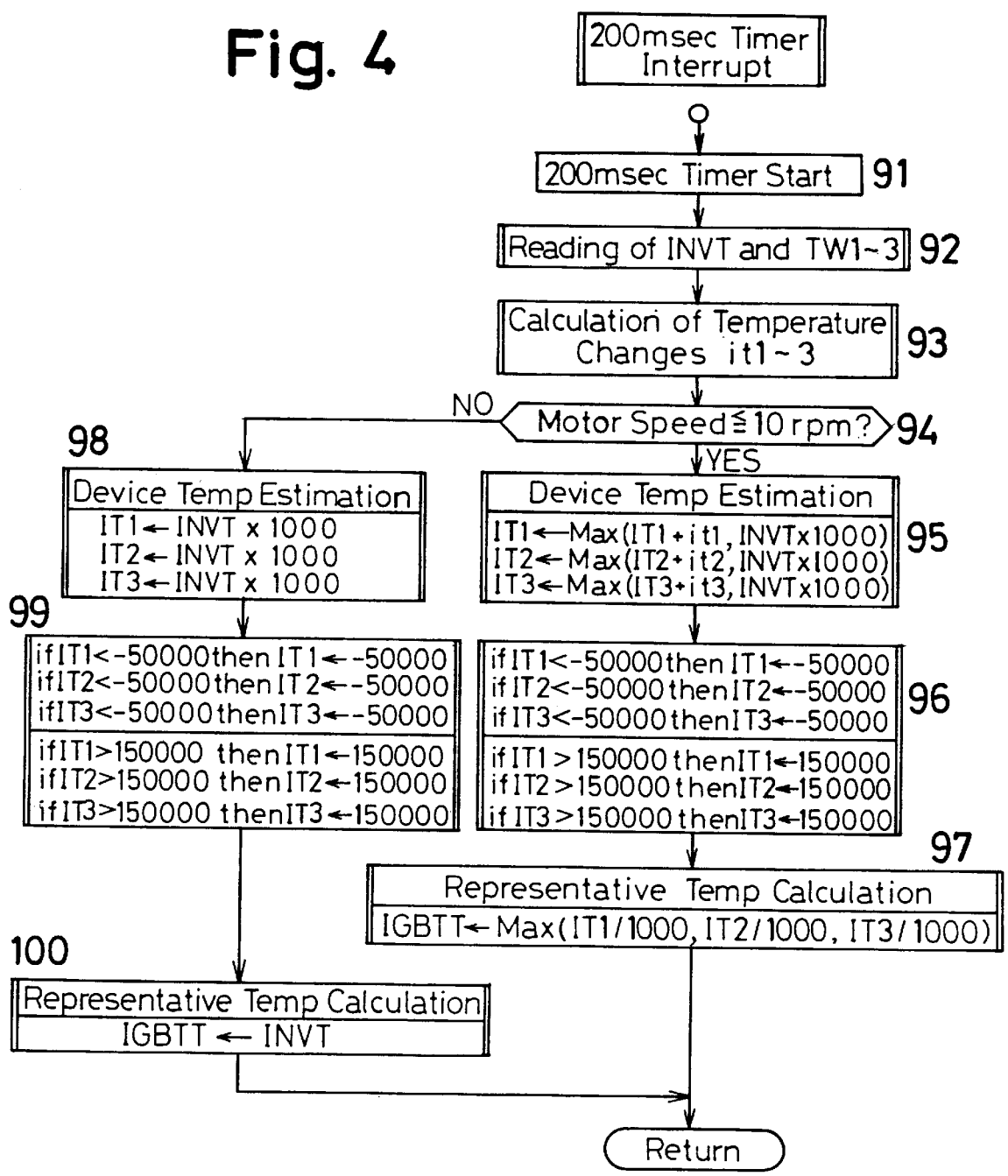
FIG. 4 is a flow chart showing content of timer interrupt processing executed by the CPU 11 shown in FIG. 1 at intervals of 200 msec.

Here the content of this interrupt processing will be described with reference to FIG. 4. When the 200 msec timer reaches its time limits, the CPU 11 restarts the 200 msec timer (91), reads in the temperature signal of the temperature sensor TS and converts to digital and reads in signals (analog voltages) from the integrating circuits 5 expressing time series averages of the phase currents (92). Hereinafter, the phase current value data thus read in will be simply called the phase currents TW1 to TW3. Then, temperature changes (temperature changes occurring during the 200 msec. i.e. temperature change rates) it1 and it3 corresponding to the phase currents TW1 to TW3 are calculated (93). This is shown in FIG. 6.

Figure 5:
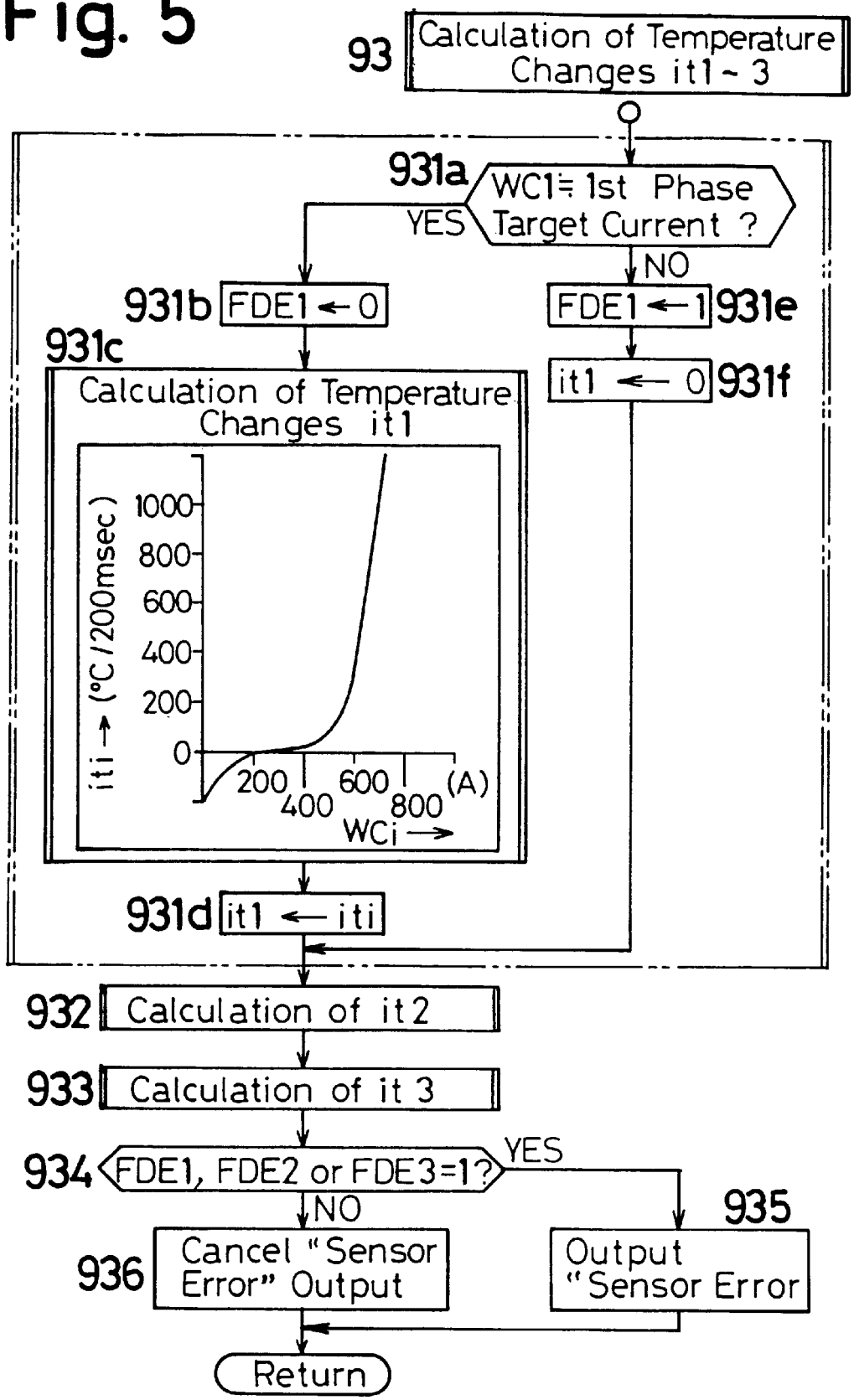
FIG. 5 is a flow chart showing content of a step, calculation of temperature changes it1 to it3' (93) shown in FIG. 4.

Referring to FIG. 5 first, calculation of a temperature change it1 for the transistors 18a, 18b of the first phase coil is carried out along with a normality check of the first current sensor 2 (931). That is, first, it is checked whether the first phase current TW1 is a value roughly equivalent to a first phase target current being fed to the current waveform generating circuit 15 by the CPU 11 (931a) and when it is widely different, '1' (abnormal) is written into a register FDE1 for storing first phase current system abnormality data (931e) and the temperature change it1 is assigned the value 0 (931f). In this case, processing proceeds to "calculation of it2" (932).

When the first phase current TW1 is a value roughly equivalent to the first phase target current, the register FDE1 is cleared (931b) and a temperature change it1 corresponding to the first phase current TW1 is calculated (931c). As shown in Table 2 below, temperature changes iti corresponding to currents TWi are written in a reference data table for this calculation.

TABLE 2

| current Twi (A) | temperature change iti (° C./200 msec) |
| --- | --- |
| 700 | 1100 |
| 660 | 666 |
| 600 | 285 |
| 550 | 140 |
| 500 | 80 |
| 400 | 20 |
| 300 | 2 |
| 240 | 0 |
| 120 | −50 |
| 0 | −200 |

When the value of the first phase current TW1 is the same as one of the values of the current TWi (A) in the reference data table, the CPU 11 directed reads out the temperature change corresponding to that value. When the value does not appear on the table, the CPU 11 reads out the nearest two current values and their corresponding temperature changes and calculates a temperature change corresponding to the first phase current TW1 by interpolation or extrapolation (when the current exceeds 700A) (931c). The calculated value is written to a register it1 (931d).

The content of the calculation of the temperature changes it2 and it3 corresponding to the second phase current TW2 and the third phase current TW3 (932, 933) is similar to that of the case of the first phase described above.

Next, it is determined from the registers FDE1 to FDE3 if there is an abnormality in any of the first through third currents (934) and if any of them is abnormal, sensor error is outputted (displayed) (935). If none are abnormal, the sensor error output is cleared (the display is reset) (936).

Returning now to FIG. 4, after the "calculation of the temperature changes it1 to it3" described above (93), the CPU 11 refers to a motor speed calculated by pulse interrupt processing executed in response to a fall in the least significant bit (a binary signal or pulse) of data expressing the detected angle of the angle sensor 1d, and checks whether this is below 10 rpm (whether it is a low speed) (94). When the motor speed is less than 10 rpm there is a possibility that the phase excitation time is long and also the exciting current is high. That is, it can be expected that the temperature rise rate will be high. In this case, the data of the individual temperature registers IT1, IT2 and IT3 are updated by the value of the higher of a sum ITi+iti obtained by adding to their present values (the values calculated 200 msec earlier) ITi (i=1 to 3) the temperature changes iti (i=1 to 3) over 200 msec calculated this time and a product obtained by multiplying the detected temperature INVT by 1000 being written into the individual temperature registers IT1 (i=1 to 3) (95). To suppress underflow and overflow of the estimated values calculated in this way, the data value of each of the individual temperature registers ITi is checked and if it is below −5000 and if it is above 150000 it is overwritten with 150000 (96). Also, the representative temperature register IGBTT is updated by being overwritten with data showing $\frac{1}{1000}$ of the maximum value of the data of the individual temperature registers IT1 to IT3 (97).

The processing described above is carried out when the motor speed is a low speed of 10 rpm or below. When the motor speed exceeds 10 rpm (hereinafter expresses as high speed), the data in the individual temperature registers IT1 to IT3 are all updated by being overwritten with a product obtained by multiplying the detected temperature INVT by 1000 (98). Then, in the same way as in step 98, processing to suppress underflow and overflow of the estimated values is carried out (99) and in this case, the representative temperature register IGBTT is updated by being overwritten with the detected temperature INVT (100). The processing described above is the content of interrupt processing executed with a period of 200 msec.

When the interrupt processing described above has been permitted (65 in FIG. 2), the CPU 11 proceeds to steady-state control of the SR motor, shown in FIG. 3 and thereafter goes around a steady-state control loop of steps 52, 53, 534 of FIG. 2, steps 66 to 74 of FIG. 3 and back to step 52 of FIG. 2 until the ignition switch VSC is switched off and during this time, the interrupt processing described above is repeated with a period of 200 msec.

In step 66 of FIG. 3, when there has been a change of some sort in the states detected in step 52, processing proceeds from step 66 to step 67. When there has been no changed, processing proceeds from step 66 to step 68.

In step 67, on the basis of the states detected in step 52, a required driving direction (specified direction) of the SR motor 1 is determined and a target value of driving torque is determined. For example, when the accelerator demand detected by the accelerator demand sensor has increased, the target value of the driving torque is also increased. Also, here a torque change flag indicating a change in the target torque is set.

In step 68, a speed of the SR motor 1 is calculated. In this preferred embodiment, because the (eleven bit) angle detection data of the angle sensor 1d changes in correspondence with rotation of the rotor of the SR motor and the period of this change is inversely proportional to the rotational speed of the motor, the CPU 11 measures the period with which the least significant bit changes by pulse interrupt processing and calculates the speed of the motor on the basis of the measured period in step 68. Data of the calculated motor speed is stored in internal memory.

When there has been a change in the rotational speed of the SR motor 1, processing proceeds from step 69 to step 71, and when there has been no change in the speed, processing proceeds to step 70. In step 70 the state of the torque change flag is checked, and when the flag has been set, that is, when there has been a change in the target torque, processing proceeds to step 71, and when there is no change in the torque a current correction coefficient Kt corresponding to the data in the representative temperature register IGBTT is calculated (74a), the calculated coefficient is multiplied by a target current calculated (73) and held for feeding to the current controllers 1 to 3, and the product data obtained is fed to the current controllers 1 to 3 (74b), whereupon processing returns to step 52.

In step 71, data is inputted from a current map memory (not shown), and in the following step 72 data is inputted from a waveform 27 map memory (not shown). In this preferred embodiment, the current map memory and the waveform map memory consist of read only memories (ROM) in which various data is prestored. In the current map memory, many data Cnm (n: value of a column corresponding to a torque, m: value of a row corresponding to a speed) associated with various target torques and various speeds (motor rotation speeds) are held, and in each set of data Cnm are included an excitation-on angle, an excitation-off angle, and a target current value. For example, the content of data C34 of when the torque is 20 [N m] and the speed is 500 [rpm] is 52.50 degrees, 82.5 degrees and 200 [A] (target current). This means that in a range of rotational position of 0° to 90°, a current of 200A is to be passed through a certain coil over the range of 52.5° to 82.5° and current is to be cut off over the range of 0° to 52.5° and the range of 82.5° to 90°.

In step 71, one set of data Cnm selected in correspondence with the torque and the speed at that time is inputted. However, the target value of the current to be actually passed through the coils does not change in an ordinary rectangular waveform but rather assumes a waveform having gentle rises and falls. This waveform is determined on the basis of the waveform map memory. In the waveform map memory, many data D1n and D2n (n: value of a row corresponding to a speed) associated with various speeds (motor rotation speeds) are held. The data D1n is a required rise angle and shows an angle over which the current is to be raised from a low level (0[A]) to a high level (for example 200[A], the target current value). The data D2n is a required fall angle and shows an angle over which the current is to be lowered from a high level (for example 200[A]) to a low level (0[A]). For example, when the data C34 of the current map memory is used, the waveform of the target current value is changed so that the rise of the target current value is started from a position an angle D1n before the excitation-on angle of 52.5° and the current rises gently until it reaches 100% at 52.5° and the fall of the target current value is started from a position an angle D2n before the excitation-off angle of 82.5° and the target current value is gently changed so that the fall is ended at 82.5°. The data D1n, D2n of the waveform map memory are predetermined so that the current rises and falls at optimum times (angles) at each speed [rpm]. That is, when the rises and falls are too rapid, differential values of the magnetic flux at the time of switching of magnetization become large and vibration and noise increase, and when the rises and falls are too slow the driving torque falls markedly and the driving efficiency also falls, and accordingly values such that vibration and noise can be well suppressed and also there is little loss of driving efficiency are set as D1n, D2n. Also, in particular, the rise time corresponding to D1n and the fall time corresponding to D2n are both made larger than the half-period of the characteristic frequency (resonance frequency) of the SR motor 1. When this is done, the frequency of vibration arising on excitation switching is lower than the characteristic frequency of the SR motor 1, and consequently resonance is prevented and vibration and noise levels are suppressed.

In step 72, according to the speed at that time one set of data D1n, D2n is selected from the waveform map memory 13b and those data are inputted into the CPU 11. For example, when the speed [rpm] is 500, data D14 and D24 are selected and inputted.

In the following step 73, on the basis of the data Cnm inputted in step 71 and the data D1n, D2n inputted in step 72, excitation map data is generated, correction processing of step 74 is applied to this current value data, and the data of the memories 15b, 15a and 15c of the current waveform generating circuit 15 are then updated (overwritten) according to this latest excitation map. Of course, excitation map data is not written to the memories 15b, 15a and 15c of the current waveform generating circuit 15 only for the first phase, but rather for each of the three phases an excitation map is created and the correction processing of step 74 is applied to this and the results for each phase are written to the current waveform generating circuit of the respective phase.

In practice, the excitation maps are created in the following way. In the case of the third phase, the target current value of an angular position A1 obtained by subtracting the required rise angle D1n from the excitation-on angle Aon included in the data Cnm is made 0, the current at the position of the excitation-on angle Aon is made the target current value (for example 200[A]) included in the data Cnm, and between the angular positions A1 and Aon the data is interpolated so as to connect the two positions with a smoothly rising curve. That is, values approximating to such a curve are obtained by calculation for every 0.5 of rotor angle, and these are made target current values for those angles. Similarly, at an angular position A1 obtained by subtracting the required fall angle D2n from the excitation-off angle Aoff included in the data Cnm the target current value is made the target current value included in the data Cnm (for example 200[A]), the target current value is made 0 at the position of the excitation-off angle Aoff, and between the angular positions A1 and Aoff the data is interpolated so as to connect the two positions with a smoothly falling curve. That is, values approximating to such a curve are obtained by calculation for every 0.5° of rotor angle, and these are made target current values for those angles. At angular positions other than those mentioned above, 0 is written as the target current value.

For the first phase and the second phase, excitation maps obtained by shifting the data of the excitation map of the third phase by 30° and 60° respectively are used.

In this preferred embodiment, because the currents flowing through the coils are controlled on the basis of excitation maps written in the current waveform generating circuits of the respective phases, the CPU 11 only has to write an excitation map into each of the current waveform generating circuits, and switching of the excitation of the coils is executed automatically by the hardware circuits according to these maps. Immediately before the excitation maps are written into the phase current waveform generating circuits, a correction coefficient Kt corresponding to the data in the representative temperature register IGBTT is calculated (74a), and the product of the excitation map data multiplied by the correction coefficient Kt is written to the current waveform generating circuits as the excitation map (74b). This correction coefficient Kt is 0, i.e. gate off, when the representative value IGBTT is 90° C. or over, 1 when it is less than 70° C., and a value decreasing from 1 to 0 in inverse proportion to the representative value IGBTT when the representative value IGBTT is between 70° C. and 90° C. In this preferred embodiment, 90° C. corresponds to a conventional gate off threshold value, and it is a relatively high value. Because at low speeds, at which there is a risk of the switching transistors 18a, 18b inside the module 1PM undergoing thermal breakdown, the representative value IGBTT is determined on the basis not only of the detected temperature INVT of the temperature sensor TS but also of the individual temperature estimated values IT1 to 1T3 for the transistors of the respective phases inside the module updated on the basis of estimated temperature changes calculated at intervals of 200 msec, the reliability of the estimation of the temperature inside the module is higher than when only the detected temperature INVT is used, and with the representative values of between 70° C. and 90° C., motor driving which avoids thermal breakdown and also provides as much required current to the motor as possible is carried out, and the reliability of this motor driving is high.

Referring again to FIG. 2, when the signal VSs read in step 52 showing on/off of the ignition switch VSC changes to L (off), processing proceeds from step 53 to step 75, and because here the data of the register Fvsc is 1 (driving power supply relay PR on), the driving power supply relay PR is switched off (76). It is then checked whether the driving power supply voltage Vp (the output voltage of the isolating voltage convertor circuit VCT) is less than IV (77), and if it is above IV, phase target current values for essentially not rotating the motor but nevertheless causing discharging of the capacitor Cap to end within 150 msec are calculated and fed to the current waveform generating circuits (82).

When the voltage of the capacitor Cap falls below IV as a result of this passing of current through the motor, the CPU 11 writes a target current value of 0A into each phase register (77, 78), and feeds this to the current controllers 1 to 3 to stop currents being passed through the motor (79). It then switches off the control power supply relay CR (80), clears the register Fvsc (81), and thereafter stands by for the ignition switch VSC to be switched on again by going through steps 52, 53, 75 and 52.

In the preferred embodiment described above, the currents of the coils 1a to 1c of the phases of the electric motor 1 are detected by current sensors 2 to 4, and temperatures are estimated on the basis of these detected currents; however, the invention can also be embodied by a construction wherein temperatures are estimated on the basis of excitation command currents from the current controllers 1 through 3 to the phase coils 1a through 1c. In this case, for example in the "calculation of temperature changes it1 to it3" of the above mentioned step 93, the current data fed to the current controllers 1 through 3 in step 74b (FIG. 3) can be used as the current values WC1 to WC3.

While the preferred embodiments have been described, variations thereto will occur to those skilled in the art within the scope of the present inventive concepts which are delineated by the following claims.

What is claimed is:

1. An overheating protection system of a switching module, comprising:

temperature detecting means for detecting the temperature of the switching module passing a current through a load;

temperature estimating means for calculating a temperature change rate of a switching device inside the switching module corresponding to a current passed through the load and calculating an estimated value of the internal temperature of the switching module on the basis of the calculated temperature change rate and the detected temperature; and current limiting means for on the basis of the value estimated by the temperature estimating means correcting a target current value of current controlling means for controlling a current passed by the switching device.

2. An overheating protection system of a switching module according to claim 1, further comprising current detecting means for detecting a load current or a command value of a current to the load, wherein the temperature estimating means calculates a temperature change rate corresponding to the current value detected by the current detecting means, the temperature change rate having a positive high value when said current value is high and a negative low value when said current value is low.

3. An overheating protection system of a switching module, comprising:

temperature detecting means for detecting the temperature of the switching module for passing currents through phase coils of an electric motor;

temperature estimating means for calculating temperature change rates of switching devices inside the switching module corresponding to currents passed through the phase coils of the electric motor and calculating an estimated value of the internal temperature of a switching device of each phase inside the switching module on the basis of the calculated temperature change rates and the detected temperature; and current limiting means for on the basis of the estimated temperature values calculated by the temperature estimating means correcting target current values of current controlling means for controlling currents passed through the phase coils of the electric motor.

4. An overheating protection system of a switching module according to claim 3, wherein the temperature estimating means sets the maximum value of estimated temperature values of the switching devices of the phases as a representative temperature and the current limiting means corrects the target current values of the current controlling means for controlling the currents passed through the phase coils of the electric motor on the basis of the representative temperature.

5. An overheating protection system of a switching module according to claim 3, further comprising current detecting means for detecting currents of the phase coils of the electric motor or command values of currents to the phase coils, wherein the temperature estimating means calculates temperature change rates corresponding to the phase current values detected by the current detecting means, the temperature change rates each having a positive high value when the respective current value is high and a negative low value when the respective current value is low.

* * * * *

UNITED STATES PATENT AND TRADEMARK OFFICE
CERTIFICATE OF CORRECTION

PATENT NO. : 5,936,820
DATED : August 10,1999
INVENTOR(S) : Chiaki Umemura, et al.

It is certified that error appears in the above-identified patent and that said Letters Patent is hereby corrected as shown below:

On the title page,

[30] Foreign Application Priority Data

May 30, 1997   [JP]   Japan   09(1997)-142746

Signed and Sealed this

Sixteenth Day of May, 2000

Attest:

Q. TODD DICKINSON

*Attesting Officer*          *Director of Patents and Trademarks*